United States Patent [19]

Yamamoto et al.

[11] 4,376,099
[45] Mar. 8, 1983

[54] PROCESS FOR RECOVERING CR(VI) IONS FROM A CHLORATE CELL LIQUOR

[75] Inventors: Hideo Yamamoto, Shibukawa; Isao Isa, Misatomachi; Morioki Shibuya, Shibukawa, all of Japan

[73] Assignee: The Japan Carlit Co., Ltd., Tokyo, Japan

[21] Appl. No.: 295,699

[22] Filed: Aug. 24, 1981

[30] Foreign Application Priority Data

Sep. 2, 1980 [JP] Japan .................. 55-121430
Dec. 29, 1980 [JP] Japan .................. 55-187567

[51] Int. Cl.$^3$ .................................. C01G 37/14
[52] U.S. Cl. ................... 423/54; 423/478; 423/475; 423/58; 204/95; 210/684; 210/913
[58] Field of Search .............. 423/54, 55, 478, 58; 210/684, 913; 204/95

[56] References Cited

U.S. PATENT DOCUMENTS

| 3,427,236 | 2/1969 | Scholander | 204/95 |
| 3,664,950 | 5/1972 | Saraceno | 423/54 |
| 3,835,001 | 9/1974 | O'Brien | 423/54 |
| 3,980,751 | 9/1976 | Foulkes | 423/54 |
| 4,036,751 | 7/1977 | Orita | 210/684 |

Primary Examiner—Brian E. Hearn
Attorney, Agent, or Firm—Frishauf, Holtz, Goodman & Woodward

[57] ABSTRACT

From a chlorate cell liquor containing an alkali metal chlorate, an alkali metal chloride and Cr(VI) ions, Cr(VI) ions are recovered by means of a combination of simple chemical procedures and re-used in an electrolysis step for manufacturing an alkali metal chlorate.

8 Claims, 3 Drawing Figures

PROCESS FOR RECOVERING CR(VI) IONS FROM A CHLORATE CELL LIQUOR

BACKGROUND OF THE INVENTION (1) Field of the Invention

This invention relates to a process for recovering Cr(VI) ions from a chlorate cell liquor containing an alkali metal chlorate, an alkali metal chloride and Cr(VI) ions, and for re-using the recovered Cr(VI) ions in an electrolysis step for manufacturing an alkali metal chlorate, said chlorate cell liquor resulting from an electrolytic process for manufacturing an alkali metal chlorate in which an alkali metal chloride is electrolytically oxidized to an alkali metal chlorate.

(2) Description of Prior Art

A chlorate cell liquor contains mainly sodium chlorate and sodium chloride. However, it is conventional to add Cr(VI) ions (By the term "Cr(VI) ions" we mean chromate and/or dichromate.) to the electrolyte for the purpose of suppressing the cathodic reduction of the intermediately formed hypochlorite ions. Because of the toxicity of Cr(VI) ions, discharge of any Cr(VI) ions to the environment should be avoided, since even only small amounts of Cr(VI) ions cause seriously environmental pollution. Moreover, the solid chlorate products crystallized from a chlorate cell liquor containing Cr(VI) ions are colored yellow with the attached Cr(VI) ions, which reduce the commercial value of such products. At present, the attached Cr(VI) ions are removed by water-washing or recrystallization, and a refined aqueous chlorate solution can be produced only by dissolving the recrystallized solid chlorate in fresh water. However, this requires a complicated process and equipment.

Chlorine dioxide is a commercially important material in such fields as pulp bleaching and fat decoloring, and also has recently been used for the purpose of environmental protection and pollution abatement as in the removal of phenols from industrial sewage and in the denitration of industrial waste gases. A process for manufacturing chlorine dioxide by reacting an alkali metal chlorate with hydrochloric acid in a single generator-crystallizer is described in Japanese Patent Publication No. 43401/1980 and Japanese Patent Public Disclosure (Kokai) No. 74296/1979. This process comprises a step of feeding an alkali metal chlorate and hydrochloric acid to a single generator-crystallizer, a step of evaporating water from an aqueous reaction medium in the single generator-crystallizer, therein depositing the corresponding alkali metal chloride, a step of withdrawing a gaseous mixture consisting of chlorine dioxide, chlorine and water vapor and a step of recovering said alkali metal chloride. In this process, a palladium complex is added as a catalyst for manufacturing the valuable chlorine dioxide efficiently. However, if a chlorate cell liquor containing Cr(VI) ions is fed and caused to react with hydrochloric acid in such a single generator-crystallizer, Cr(VI) ions are accumulated and concentrated therein, causing such undesirable effects as the elevation of the reaction temperature due to a boiling point rise and even the poisoning of the added catalyst due to the excess of the accumulated Cr(VI) ions.

It is industrially difficult to separate Cr(VI) ions by water-washing or the recrystallization in that foregoing process. Moreover, Cr(VI) ions are so valuable that it is desirable to recover them and to re-use them in the electrolytic cell.

Processes for recovering Cr(VI) ions by reducing them to Cr(III) ions have been proposed, for example, in Japanese Patent Publication No. 7692/1969, in which Cr(VI) ions are reduced to Cr(III) ions with ferrous salts and removed by forming a precipitate of hydrous chromic oxide from an aqueous chlorate cell liquor containing Cr(VI) ions. With this process, however, it is necessary to reoxidize Cr(III) ions back to Cr(VI) ions. A process for recovering Cr(VI) ions by anion exchange resins was proposed in U.S. Pat. No. 3,835,001. However, in this process regeneration of the anion exchange resin bed adsorbing Cr(VI) ions by passing an aqueous alkali metal hydroxide solution containing an alkali metal chloride through the bed is not efficient, so it is desirable to improve the efficiency of the regeneration.

SUMMARY OF THE INVENTION

It is an object of this invention to provide an improved process for recovering Cr(VI) ions from a chlorate cell liquor containing a high concentration of an alkali metal chlorate, an alkali metal chloride and Cr(VI) ions, and for re-using the recovered Cr(VI) ions in an electrolysis step.

Another object of this invention is to provide a process for manufacturing a solid chlorate containing no Cr(VI) ions and for manufacturing a refined aqueous chlorate solution easily.

Still another object of this invention is to provide a Cr(VI) ion-substantially free chlorate cell liquor to be fed to a single generator-crystallizer for manufacturing chlorine dioxide for the purpose of preventing catalytic poisoning of an added catalysis.

A further object of this invention is to provide a process for closing the clorate cycle with respect to Cr(VI) ions so as to protect the environment.

DETAILED DESCRIPTION OF THE PREFERRED EMBODIMENT

A Cr(VI) ions-containing chlorate cell liquor containing an alkali metal chlorate and an alkali metal chloride is acidified to a pH-value of from 1 to 5, and then passed through an anion exchange resin bed, by which most of the Cr(VI) ions are separated. Then, an aqueous alkali metal chloride and/or alkali metal chlorate solution containing a barium salt soluble in water is added to the effluent at a pH-value above 7 to precipitate barium chromate.

The precipitate is filtered and a Cr(VI) ion-substantially free chlorate cell liquor is obtained. The filtered precipitate of barium chromate is dissolved in an aqueous hydrochloric acid solution, which is, then, passed through a cation exchange resin bed to adsorb only barium ions and an aqueous hydrochloric acid solution containing Cr(VI) ions is obtained. Moreover, the anion exchange resin bed is regenerated more efficiently with an eluent containing 0.05 to 1.0 mol/l of an aqueous alkali metal hydroxide, 1.0 to 5.0 mol/l of an alkali metal chloride and 0.1 to 5.0 mol/l of an alkali metal chlorate. The Cr(VI) ions-containing aqueous hydrochloric acid solution passed through the cation exchange resin bed and the Cr(VI) ions-containing aqueous alkali metal hydroxide solution containing an alkali metal chloride and an alkali metal chlorate from the regeneration stage of the anion exchange resin bed are mixed and returned to the electrolysis step after adjusting the pH-value and the chloride concentration. On the other hand, the cation exchange resin bed which adsorbs the barium ions is regenerated by passing an eluent of an alkali metal chloride and/or an alkali metal chlorate through it. The effluent of an alkali metal chloride and/or an alkali metal chlorate containing barium ions is returned to the vessel to be used for precipitating barium chromate.

Said alkali metal chlorate is commonly sodium chlorate or potassium chlorate, said alkali metal chloride is commonly sodium chloride or potassium chloride and said barium salt soluble in water is commonly barium chloride or barium nitrate.

Figure 1:
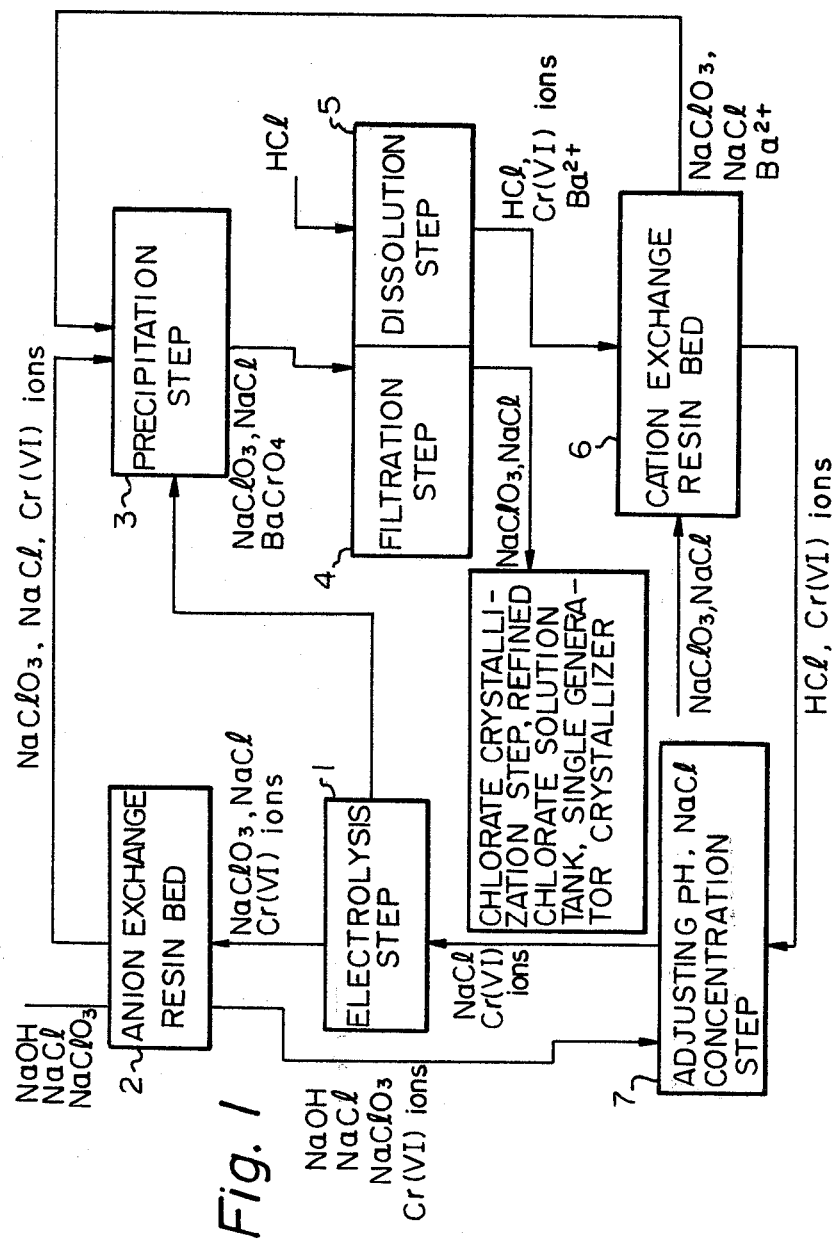
FIG. 1 shows a flow diagram of the process for recovering Cr(VI) ions from a chlorate cell liquor.

A detailed explanation referring to the flow diagram (FIG. 1) is given below.

A chlorate cell liquor flowing out of an electrolysis step (1) commonly contains an alkali metal chlorate of 3.2–5.2 mol/l, an alkali metal chloride of 1.4–2.6 mol/l and Cr(VI) ions of about $3.0 \times 10^{-2}$ g-ions/l. In order to recover the Cr(VI) ions from the chlorate cell liquor, it is reasonable to mix the chlorate cell liquor with an aqueous alkali metal chlorate and/or an alkali metal chloride containing a barium salt soluble in water to precipitate barium chromate at a precipitation step (3). However, it is more reasonable to pass the chlorate cell liquor once through an anion exchange resin bed (2) to adsorb most of the Cr(VI) ions and then to mix the aqueous alkali metal chlorate and/or alkali metal chloride solution containing a barium salt soluble in water with the effluent chlorate cell liquor to precipitate barium chromate. The latter process is more often used because in it the amount of the barium chromate precipitate is much less than in the former.

Before the chlorate cell liquor is passed through an anion exchange resin bed, the pH-value of the chlorate cell liquor should be adjusted from 1 to 5, preferably from 1.5 to 3. The lower the pH-value of the chlorate cell liquor, the more efficiently Cr(VI) ions are adsorbed. However, if the pH-value is lower than 1, the chlorate is decomposed and, if it is higher than 5, the adsorbing effect is reduced. Said anion exchange resin is commonly a strongly basic anion exchange resin or a weakly basic anion exchange resin.

Since the barium chromate is formed from $Ba^{2+}$ and $CrO_4^{2-}$, in order to precipitate barium chromate the pH-value of the chlorate cell liquor must be adjusted to above 7, at which the Cr(VI) ions take the form of $CrO_4^{2-}$, and an aqueous alkali metal chlorate and/or alkali metal chloride solution containing a barium salt soluble in water is added to the chlorate cell liquor at a gram-ion ratio of barium ions to Cr(VI) ions of from 1 to 8. If the gram-ion ratio of barium ions to Cr(VI) ions is higher than 8, there is no particular advantage. In this process, if a flocculant or a filter aid commonly used is added, the filtration becomes easier. The precipitate of barium chromate is filtered mechanically in a process (4) and the concentration of Cr(VI) ions in a chlorate cell liquor is reduced to some parts per million. Said chlorate cell liquor is fed to a chlorate crystallization process, a refined chlorate solution tank, or a single generator-crystallizer for manufacturing chlorine dioxide. The filter cake of barium chromate is readily dissolved in an aqueous hydrochloric acid solution at a concentration weaker than 6 N. It is not preferred to use the aqueous hydrochloric acid solution at a concentration of stronger than 6 N, because this will reduce the Cr(VI) ions to Cr(III) ions. Barium ions contained in the aqueous hydrochloric acid solution, which also contains a few Cr(VI) ions, are adsorbed by passing it through a cation exchange resin bed (6), and then the effluent passed through the cation exchange resin bed containing Cr(VI) ions is sent to a subsequent step (7). On the other hand, the cation exchange resin bed (6) adsorbing barium ions are regenerated by passing an eluent of an aqueous alkali metal chlorate and/or alkali metal chloride solution through the bed. This effluent containing barium ions is returned to the precipitation step (3) for re-use. When the concentrations of the alkali metal chlorate and the alkali metal chloride in the eluent to regenerate the cation exchange resin are equivalent to those of the chlorate cell liquor, the concentrations of the alkali metal chlorate and the alkali metal chloride of the Cr(VI) ion-substantially free chlorate cell liquor will remain unchanged. It is desirable to keep the concentrations of the alkali metal chlorate and the alkali metal chloride in the feed to the single generator-crystallizer as constant as possible. In this process, a strongly acidic cation exchange resin can be used in the cation exchange column. In the meanwhile, the anion exchange resin bed (2) adsorbing Cr(VI) ions is regenerated by passing an eluent of an aqueous alkali metal hydroxide solution containing an alkali metal chloride and an alkali metal chlorate through the bed. The alkali metal chloride and the alkali metal chlorate concentrations should be used from 1.0 to 5.0 mol/l and from 0.1 to 5.0 mol/l, respectively, and the concentration of the alkali metal hydroxide is from 0.05 to 1.0 mol/l.

If the concentration of the alkali metal hydroxide is less than 0.05 mol/l, efficient regeneration is not attained, and if it is more than 1.0 mol/l, a large amount of an acid for neutralizing is necessary. The lower limit of the chloride concentration of the eluent is set by its usefulness for the electrolytic step, while the upper limit is set by the solubility of the alkali metal chloride. Similarly, the upper limit of the chlorate concentration of the eluent is set by the solubility of the alkali metal chlorate, while with a concentration of less than 0.1 mol/l, little elution takes place. The effluent from the regeneration stage of the anion exchange resin bed is sent to the step (7) for adjusting pH and NaCl concentration. At the step (7), the Cr(VI) ions-containing hydrochloric acid solution passed through the cation exchange resin bed and the Cr(VI) ions-containing alkali metal hydroxide solution containing an alkali metal chloride and an alkali metal chlorate from the regeneration stage of the anion exchange resin bed are mixed and returned to the electrolysis step after suitably adjusting the pH value and the concentration of the alkali metal chlorides. In cases where it is not required to reduce the concentration of the Cr(VI) ions to an extremely low value, the chlorate cell liquor can be utilized after passing only through an anion exchange resin bed, for example, as in the case of using the chlorate cell liquor for manufacturing chlorine dioxide.

Embodiments of this invention are illustrated in detail in the following examples. It should be understood that this invention is, however, in no way limited by the Examples, which are given only for the purpose of illustration of this invention.

EXAMPLE 1

Ten liters of a chlorate cell liquor containing 3.74 mol/l NaClO$_3$, 2.00 mol/l NaCl and 3.0×10$^{-2}$ g-ion/l (1600 ppm) Cr(VI) ions, and having a pH of 6.90 was obtained from an electrolytic cell for manufacturing an alkali metal chlorate. The chlorate cell liquor, having a pH adjusted to 2.39 by adding an appropriate amount of HCl, was passed through an anion exchange resin bed made by packing one liter of an anion exchange resin IRA-400 into a 3.5 cm diameter column. Consequently an effluent containing 3.74 mol/l NaClO$_3$, 2.00 mol/l NaCl and 1.3×10$^{-3}$ g-ion/l (70 ppm) Cr(VI) ions was obtained. Two hundred and thirty milliliters of an aqueous solution containing 3.74 mol/l NaClO$_3$, 2.00 mol/l NaCl and 1.13×10$^{-1}$ mol/l BaCl$_2$ was prepared and mixed with the effluent of the chlorate cell liquor at a pH of 9.0 and BaCrO$_4$ insoluble in water was precipitated. This precipitate was filtered and a filtrate containing 9.6×10$^{-5}$ g-ion/l (5 ppm) Cr(VI) ions was obtained. When solid chlorate was crystallized from said filtrate by a common method, the Cr(VI) ions attached to the solid chlorate amounted to only 0.01 ppm.

The amount of the BaCrO$_4$ precipitate was 3.1 g and the precipitate was dissolved in 220 ml of 0.5 N-HCl. Said HCl solution containing barium ions and Cr(VI) ions was passed through a cation exchange resin bed made by packing 50 ml of a cation exchange resin, IR-120-B, into a column, by which 99 percent of barium ions were separated, with the resulting effluent being 220 ml of a 0.5 N-HCl solution containing 5.5×10$^{-2}$ g-ion/l Cr(VI) ions. Said cation exchange resin bed with adsorbed barium ions was regenerated by passing 230 ml of an eluent containing 3.74 mol/l NaClO$_3$, 2.00 mol/l NaCl and having a pH of 2.10, and consequently an effluent containing 3.74 mol/l NaClO$_3$, 2.00 mol/l NaCl and 4.9×10$^{-2}$ g-ion/l barium ions was obtained. An appropriate amount of BaCl$_2$ was added to said effluent to adjust the concentration of the barium ions to 1.13×10$^{-1}$ g-ion/l and the effluent was returned to the BaCrO$_4$ precipitation step.

In the meantime, the anion exchange resin bed adsorbing Cr(VI) ions was regenerated by passing 8.5 liters of eluent containing 4.6 mol/l NaCl, 1.09 mol/l NaClO$_3$ and 0.1 mol/l NaOH through it, and consequently an effluent containing 4.6 mol/l NaCl, 1.09 mol/l NaClO$_3$, 3.0×10$^{-2}$ g-ion/l Cr(VI) ions and 0.1 mol/l NaOH was obtained. Said effluent was mixed with the effluent passed through the cation exchange resin bed, the pH and the NaCl concentration were adjusted by adding an appropriate amount of HCl and NaCl to prepare 8.9 liters of aqueous solution containing 4.61 mol/l NaCl, 1.04 mol/l NaClO$_3$, and 3.0×10$^{-2}$ g-ion/l Cr(VI) ions, and having a pH of 6.6, and then said aqueous solution was returned to an electrolytic cell for manufacturing NaClO$_3$.

The conditions for the electrolytic oxydation in a cell equipped with a Pt-Ir anode and a stainless steel cathode were as follows: temperature of 60° C., current density of 25 A/dm$^2$, and current concentration of 10 A/l. After electrolytic oxidation for 48 hours, a chlorate cell liquor containing 3.70 mol/l NaClO$_3$, 1.95 mol/l NaCl, and 3.0×10$^{-2}$ g-ion/l Cr(VI) ions with a pH of 6.90 was obtained.

EXAMPLE 2

Ten liters of a chlorate cell liquor containing 3.70 mol/l NaClO$_3$, 2.00 mol/l and 3.0×10$^{-2}$ g-ion/l (1600 ppm) Cr(VI) ions with a pH of 6.0 was obtained from an electrolytic cell for manufacturing an alkali metal chlorate. The chlorate cell liquor, with a pH adjusted to 2.39 by adding an appropriate amount of HCl, was passed through an anion exchange resin bed made by packing one liter of an anion exchange resin, IRA400, into a 3.5 cm-diameter column, and consequently, an effluent containing 1.3×10$^{-3}$ g-ion/l (70 ppm) Cr(VI) ions was obtained. Said effluent was sent to a storage tank from which it was fed to a single generator-crystallizer for manufacturing chlorine dioxide, virtually a glass vessel of 3 liter volume. The reaction medium contained 1.0 mol/l NaClO$_3$, 4.8 mol/l NaCl and 0.17 mol/l HCl, and a catalyst prepared from palladium and glycine was added to give a concentration of 3.9×10$^{-4}$ mol/l. The chlorate cell liquor, from which most of the Cr(VI) ions had been recovered, was fed at a flow rate of 7.2 ml/min at a reaction temperature of 70° C. and a reaction pressure of 185 mmHg. Consequently, a reaction yield of 96.2% for producing chlorine dioxide was attained and 2.44 mol/hr of NaCl was crystallized.

In the meanwhile, the anion exchange resin bed adsorbing Cr(VI) ions was regenerated by passing an eluent containing 0.1 mol/l NaOH, 4.6 mol/l NaCl and 1.09 mol/l NaClO$_3$. Said NaCl contained in the eluent was derived from the single generator-crystallizer. An effluent containing 4.6 mol/l NaCl, 1.09 mol/l NaClO$_3$, 0.1 mol/l NaOH and 3.0×10$^{-2}$ g-ion/l Cr(VI) ions was obtained. Said effluent was returned to an electrolytic cell after adjusting the pH-value to 6.60 by adding an appropriate amount of HCl.

Figure 2:
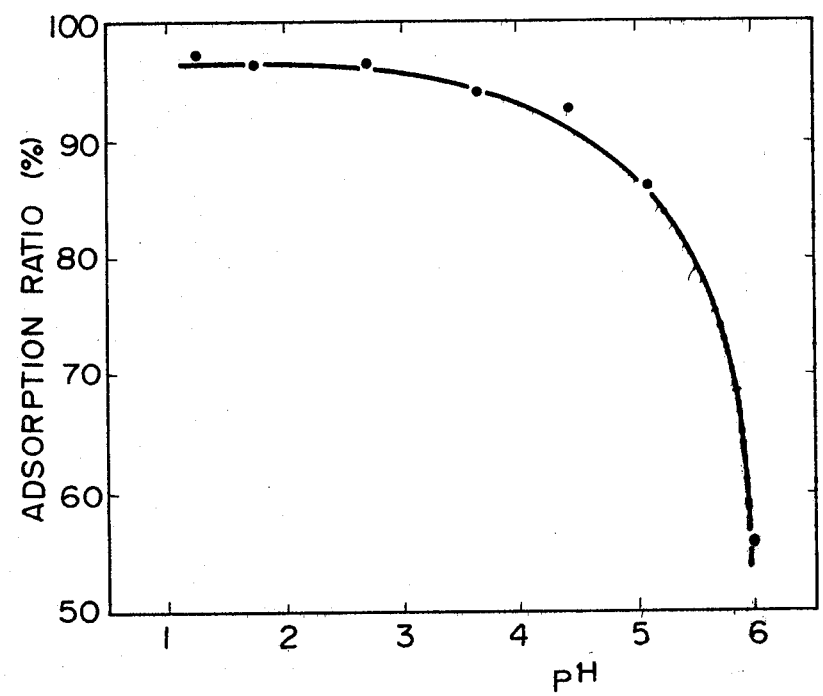
FIG. 2 shows a relation between the pH-value of a Cr(VI) ions-containing chlorate cell liquor which is passed through an anion exchange resin bed and the adsorption ratio of Cr(VI) ions.

The conditions for the electrolytic oxydation in a cell equipped with a Pt-Ir anode and a stainless steel cathode were as follows: temperature of 60° C., current density of 25 A/dm$^2$, and current concentration of 10 A/l. After electrolytic oxidation for 48 hours, a chlorate cell liquor containing 3.74 mol/l NaClO$_3$, 1.93 mol/l NaCl, and 3.0×10$^{-2}$ g-ion/l Cr(VI) ions and with a pH of 6.90 was obtained. In the meanwhile, the experiments described above were repeated except that the pH-value of the chloride cell liquor was varied from 1 to 6, and the adsorption ratios of Cr(VI) ions were measured. The results obtained are given in FIG. 2.

REFERENCE EXAMPLE 1

If a chlorate cell liquor containing Cr(VI) ions is fed and caused to react with hydrochloric acid in a single generator-crystallizer, Cr(VI) ions are accumulated and concentrated in it. It has been calculated that the composition of the reaction medium after three months of operation will be 1.25 mol/l NaClO$_3$, 1.0 mol/l NaCl, 9.0 g-ion/l Cr(VI) ions and 1.36 normal HCl, when a chlorate cell liquor containing 3.96 mol/l NaClO$_3$, 2.02 mol/l NaCl and 3.1×10$^{-2}$ g-ion/l Cr(VI) ions is fed at a flow rate of 3.7 ml/min to a single generator-crystallizer having a reaction volume of 1.6 liters, with the generator liquor containing initially 1.25 mol/l NaClO$_3$, 4.62 mol/l NaCl, 0.15 normal HCl and 1.22×10$^{-3}$ mol/l of a catalyst prepared from palladium and glycine. In order to observe how the accumulating Cr(VI) ions affect the reaction yield and other reaction conditions, a reaction medium of the composition after three months of the operation described above was prepared and a chlorate cell liquor containing 3.74 mol/l NaClO$_3$, 2.00 mol/l NaCl and 3.1×10$^{-2}$ g-ion/l of Cr(VI) ions was fed for reaction. The reaction temperature was elevated to 89.8° C. at 175 mmHg, and the yield of the chlorine dioxide producing reaction was reduced to 86.1%.

EXAMPLE 3 AND REFERENCE EXAMPLE 2

Ten milliliters of an aqueous solution containing 3.74 mol/l NaClO$_3$, 2.00 mol/l NaCl and an appropriate amount of BaCl$_2$ was mixed with 100 milliliters of a chlorate cell liquor containing 3.74 mol/l NaClO$_3$, 2.00 mol/l NaCl, and 1.5×10$^{-3}$ g-ion/l (77 ppm) Cr(VI) ions in varying the gram-ion ratio of barium ions to Cr(VI) ions for precipitating barium chromate. The precipitate was filtered and the composition of the filtrate analyzed. The results obtained are given in Table 1 below.

TABLE 1

| | barium ions | Initial Composition | | | Filtrate Composition | | |
|---|---|---|---|---|---|---|---|
| | Cr(VI) ions gram-ion ratio | Cr(VI) (ppm) | NaClO$_3$ (mol/l) | NaCl (mol/l) | Cr(VI) (ppm) | NaClO$_3$ (mol/l) | NaCl (mol/l) |
| Example | 1.0 | 70.0 | 3.76 | 2.05 | 9.7 | 3.76 | 2.05 |
| | 2.0 | 70.0 | 3.76 | 2.05 | 5.0 | 3.76 | 2.05 |
| | 4.0 | 70.0 | 3.76 | 2.05 | 1.7 | 3.76 | 2.05 |
| | 8.0 | 70.0 | 3.76 | 2.05 | 0.1 | 3.76 | 2.05 |
| Reference | 0.5 | 70.0 | 3.76 | 2.05 | 50.2 | 3.76 | 2.05 |
| Example | 10.0 | 70.0 | 3.76 | 2.05 | 0.1 | 3.76 | 2.05 |

EXAMPLE 4

Figure 3:
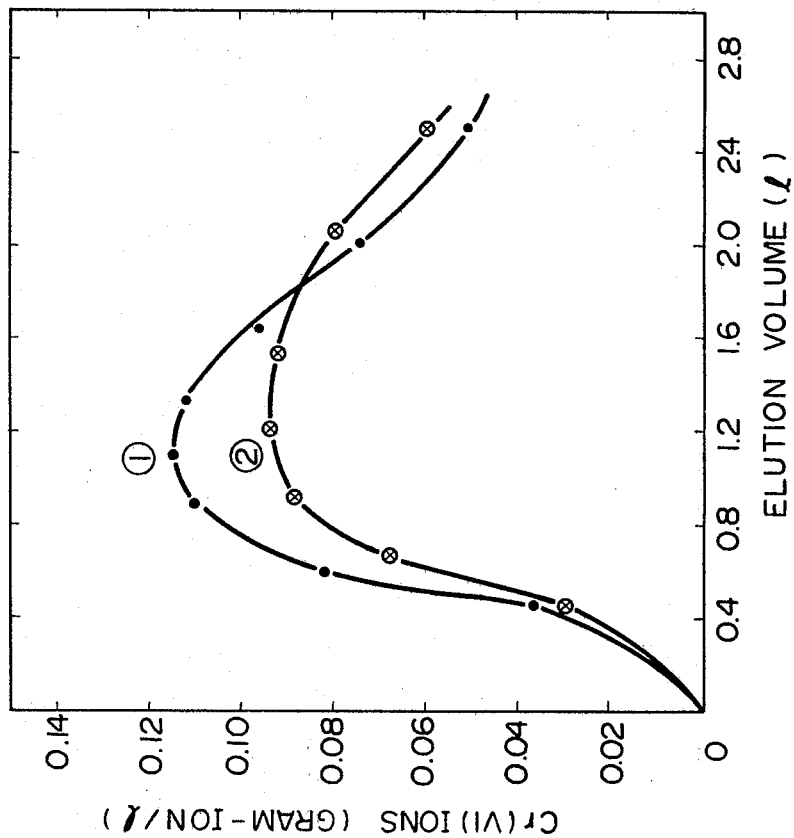
FIG. 3 shows elution curves obtained by regeneration of an anion exchange resin bed adsorbing Cr(VI) ions.

An anion exchange resin bed consisting of a 3.5 cm-diameter column packed with one liter of an anion exchange resin, IRA 400 adsorbing 0.27 g-ion of Cr(VI) ions was prepared, and 0.27 g-ion/l Cr(VI) ions were adsorbed thereby. Said anion exchange resin bed was regenerated by passing an eluent containing 1.5 mol/l NaClO$_3$, 2.0 mol/l NaCl and 0.1 mol/l NaOH through it. The elution curve obtained is given in FIG. 3-(1).

REFERENCE EXAMPLE 3

The experiment of Example 4 was repeated except that the composition of the eluent was 3.3 mol/l NaCl and 0.1 mol/l NaOH. The elution curve obtained is given in FIG. 3-(2).

REFERENCE EXAMPLE 4

The experiment of Example 4 was repeated except that the composition of the eluent was 0.1 mol/l NaOH. Consequently, there was no regeneration effect.

EXAMPLE 5 AND REFERENCE EXAMPLE 5

An anion exchange resin bed consisting of a 13.5 mm-diameter column packed with 13 ml of an anion exchange resin, IRA400 adsorbing 3.0×10$^{-3}$ g-ion of Cr(VI) ions was prepared. Said anion exchange resin bed was regenerated by passing through it 40 ml of an eluent the compositions of which were given in Table 2. The elution ratios obtained are also given in Table 2.

TABLE 2

| | Eluent Compositions | | | Result |
|---|---|---|---|---|
| | NaClO$_3$ (mol/l) | NaCl (mol/l) | NaOH (mol/l) | Elution ratio (%) |
| Example | 2.00 | 1.40 | 0.05 | 75.0 |
| | 2.00 | 1.40 | 0.20 | 78.8 |

TABLE 2-continued

| | Eluent Compositions | | | Result |
|---|---|---|---|---|
| | NaClO$_3$ (mol/l) | NaCl (mol/l) | NaOH (mol/l) | Elution ratio (%) |
| | 2.00 | 1.40 | 0.51 | 80.6 |
| | 2.00 | 1.40 | 0.89 | 88.1 |
| Reference | 2.00 | 1.40 | 0.005 | 7.0 |
| Example | 2.00 | 1.40 | 1.50 | 88.0 |
| | 0 | 0 | 1.00 | 53.9 |

$$\text{elution ratio (\%)} = \frac{\text{removed amount of Cr(VI) ions}}{\text{adsorbed amount of Cr(VI) ions}} \times 100$$

It is obvious that the elution ratio is remarkably reduced at a NaOH concentration of lower than 0.05 mol/l, and there is no particular improvement at a NaOH concentration of higher than 0.89 mol/l, and higher NaOH concentration is not preferred to avoid too much amount of acid to neutralize the NaOH. Moreover, when the eluent contains neither NaClO$_3$ nor NaCl, the elution ratio is also reduced.

EXAMPLE 6 AND REFERENCE EXAMPLE 6

An anion exchange resin bed consisting of a 3.5 cm-diameter column packed with one liter of an anion exchange resin, IRA400, adsorbing 0.3 g-ion of Cr(VI) ions was prepared.

Said anion exchange resin bed was regenerated by passing 3 liters of eluent the compositions of which are given in Table 3. The elution ratios obtained are also given in Table 3.

TABLE 3

| | Eluent Compositions | | | Result |
|---|---|---|---|---|
| | NaOH | NaClO$_3$ | NaCl | Elution ratio (%) |
| Example | 0.1 | 1.0 | 1.0 | 71.5 |
| | 0.1 | 1.0 | 2.0 | 73.6 |
| | 0.1 | 1.0 | 3.3 | 76.7 |
| | 0.1 | 1.0 | 4.6 | 78.0 |
| | 0.1 | 2.3 | 1.0 | 76.4 |
| | 0.1 | 3.8 | 1.0 | 80.8 |
| | 0.1 | 0.1 | 4.6 | 73.3 |
| Reference | 0.1 | 0 | 2.0 | 66.3 |
| Example | 0.1 | 0 | 3.3 | 68.1 |
| | 0.1 | 0 | 4.9 | 69.7 |
| | 0.1 | 0.2 | 0.1 | 3.5 |
| | 0.1 | 0.01 | 4.6 | 69.9 |

It is obvious that the elution ratio is reduced remarkably at a concentration of NaCl less than 1.0 mol/l, even if the concentration of NaOH is B 0.1 mol/l. Moreover, the elution ratio decreases to below 70% at a concentration of NaClO$_3$ less than 0.1 mol/l, even if the concentration of NaCl is more than 1.0 mol/l.

What is claimed is:

1. A process for recovering Cr(VI) ions which comprises the steps of:

(1) acidifying a Cr(VI) ions-containing chlorate cell liquor containing an alkali metal chlorate and an alkali metal chloride to a pH-value of from 1 to 5 and passing through an anion exchange resin bed to produce a chlorate cell liquor from which most of Cr(VI) ions are separated;

(2) regenerating the anion exchange resin bed by passing through it an eluent of an aqueous alkali metal hydroxide solution of 0.05–1.0 mole per liter containing an alkali metal chloride of 1.0–5.0 moles per liter and an alkali metal chlorate of 0.1–5.0 moles per liter to remove the adsorbed Cr(VI) ions therefrom; and (3) returning the effluent from the regeneration stage of the anion exchange resin bed to an electrolysis step.

2. A process as claimed in claim 1 in which the chlorate cell liquor is acidified to a pH-value of from 1.5 to 3.

3. A process for recovering Cr(VI) ions which comprises the steps of:

(1) acidifying a Cr(VI) ions-containing chlorate cell liquor containing an alkali metal chlorate and an alkali metal chloride to a pH-value of from 1 to 5 and passing through an anion exchange resin bed to produce a chlorate cell liquor from which most of the Cr(VI) ions are separated;

(2) feeding said chlorate cell liquor from which most of Cr(VI) ions have been removed to a single generator-crystallizer for manufacturing chlorine dioxide therefrom;

(3) regenerating the anion exchange resin bed by passing through it an eluent of an aqueous alkali metal hydroxide solution of 0.05–1.0 mole per liter containing an alkali metal chloride of 1.0–5.0 moles per liter and an alkali metal chlorate of 0.1–5.0 moles per liter to remove the adsorbed Cr(VI) ions therefrom; and (4) returning the effluent from the regeneration stage of the anion exchange resin bed to an electrolysis process.

4. A process as claimed in claim 3 in which a solid alkali metal chloride recovered from the single generator-crystallizer as a by-product is re-used to make up the eluent of an aqueous alkali metal hydroxide solution described in the step (3).

5. A process as claimed in claims 3 and 4 in which the chlorate cell liquor is acidified to a pH-value of from 1.5 to 3.

6. A process for recovering Cr(VI) ions which comprises the steps of:

(1) adding an aqueous alkali metal chloride and/or an alkali metal chlorate solution containing a barium salt soluble in water to a Cr(VI) ion-containing chlorate cell liquor containing an alkali metal chlorate and an alkali metal chloride at a pH-value above 7 to precipitate barium chromate;

(2) filtering the precipitate of barium chromate to produce a Cr(VI) ion-substantially free chlorate cell liquor;

(3) dissolving the precipitate of barium chromate in an aqueous hydrochloric acid solution weaker than 6 normal;

(4) passing said aqueous hydrochloric acid solution containing barium ions and Cr(VI) ions through a cation exchange resin bed to adsorb barium ions and obtaining an aqueous hydrochloric acid solution containing Cr(VI) ions;

(5) regenerating said cation exchange resin bed by passing through it an eluent of an aqueous alkali metal chloride and/or alkali metal chlorate solution to remove barium ions therefrom;

(6) returning said aqueous alkali metal chloride and/or alkali metal chlorate solution containing barium ions to the precipitation step described in the step (1); and (7) returning the aqueous hydrochloric acid solution containing Cr(VI) ions to an electrolysis step for manufacturing an alkali metal chlorate.

7. A process as claimed in claim 6 in which the concentrations of the alkali metal chloride and the alkali metal chlorate of the eluent described in the step (5) are equivalent to the concentrations of the alkali metal chloride and the alkali metal chlorate of the Cr(VI) ions-containing chlorate cell liquor, respectively.

8. A process for recovering Cr(VI) ions which comprises the steps of:

(1) acidifying a Cr(VI) ion-containing chlorate cell liquor containing an alkali metal chlorate and an alkali metal chloride to a pH-value of from 1 to 5 and passing through an anion exchange resin bed;

(2) adding an aqueous alkali metal chloride and/or alkali metal chlorate solution containing a barium salt soluble in water to the effluent passed through the anion exchange resin bed at a pH-value of above 7 to precipitate barium chromate;

(3) filtering the precipitate of barium chromate to produce a Cr-(VI) ion-substantially free chlorate cell liquor;

(4) dissolving the precipitate of barium chromate in an aqueous hydrochloric acid solution at a concentration weaker than 6 normal;

(5) passing said aqueous hydrochloric acid solution containing barium ions and Cr(VI) ions through a cation exchange resin bed to adsorb barium ions and obtaining an aqueous hydrochloric acid solution containing Cr(VI) ions, which is named a first solution;

(6) regenerating said cation exchange resin bed by passing through it an eluent of an aqueous alkali metal chloride and/or alkali metal chlorate solution to remove barium ions therefrom;

(7) returning said aqueous alkali metal chloride and/or alkali metal chlorate solution containing barium ions to the precipitation step described in the step (2);

(8) regenerating the anion exchange resin bed by passing an eluent of an aqueous alkali metal hydroxide solution of 0.05–1.0 moles per liter containing an alkali metal chloride of 1.0–5.0 moles per liter and an alkali metal chlorate of 0.1–5.0 moles per liter, the effluent being named a second solution; and (9) returning the first solution and the second solution to an electrolysis step for manufacturing alkali metal chlorate after mixing thereof.

* * * * *